United States Patent [19]
Miller

[11] 3,895,421
[45] July 22, 1975

[54] METHOD OF ADJUSTING THE SENSITIVITY OF A WEIGHING MAT

[75] Inventor: Henry F. Miller, Clifton, N.J.
[73] Assignee: Uniroyal, Inc., New York, N.Y.
[22] Filed: Jan. 2, 1974
[21] Appl. No.: 430,370

[52] U.S. Cl. .................. 29/25.42; 29/593; 177/210; 317/246; 317/261
[51] Int. Cl. ............................................. H01g 13/00
[58] Field of Search ........... 29/25.42, 593; 177/210; 317/246, 249 R, 261

[56] References Cited
UNITED STATES PATENTS

| | | | |
|---|---|---|---|
| 3,402,448 | 9/1968 | Heath ................................ | 29/25.42 |
| 3,565,195 | 2/1971 | Miller et al. ........................ | 177/210 |
| 3,648,132 | 3/1972 | Rayburn ............................ | 29/25.42 |
| 3,782,486 | 1/1974 | Kuhn et al. ........................ | 177/210 |

Primary Examiner—Carl E. Hall
Attorney, Agent, or Firm—Charles A. Blank, Esq.

[57] ABSTRACT

A method of adjusting the relative sensitivities of sections of a weighing mat which preferably includes three elastomeric, conductive layers. The outer conductive layers are separated from the central conductive layer by two, dielectric elastomeric layers having spaced ribs to form a capacitor whose capacitance varies with compressive loading. Due to different boundary conditions or manufacturing variations, sections of the mat have different relative sensitivities to an applied load. The method comprises removing from a mat section of low sensitivity at least one portion of one conductive layer to bring the relative sensitivities of the mat sections within predetermined tolerance limits.

7 Claims, 6 Drawing Figures

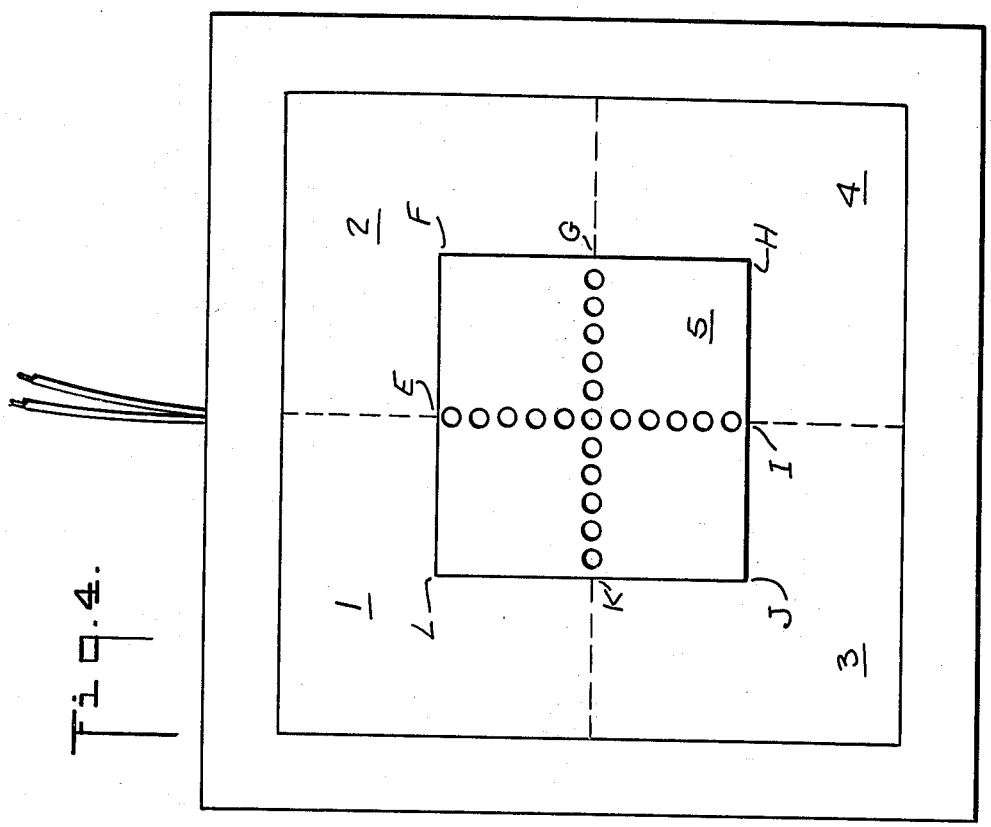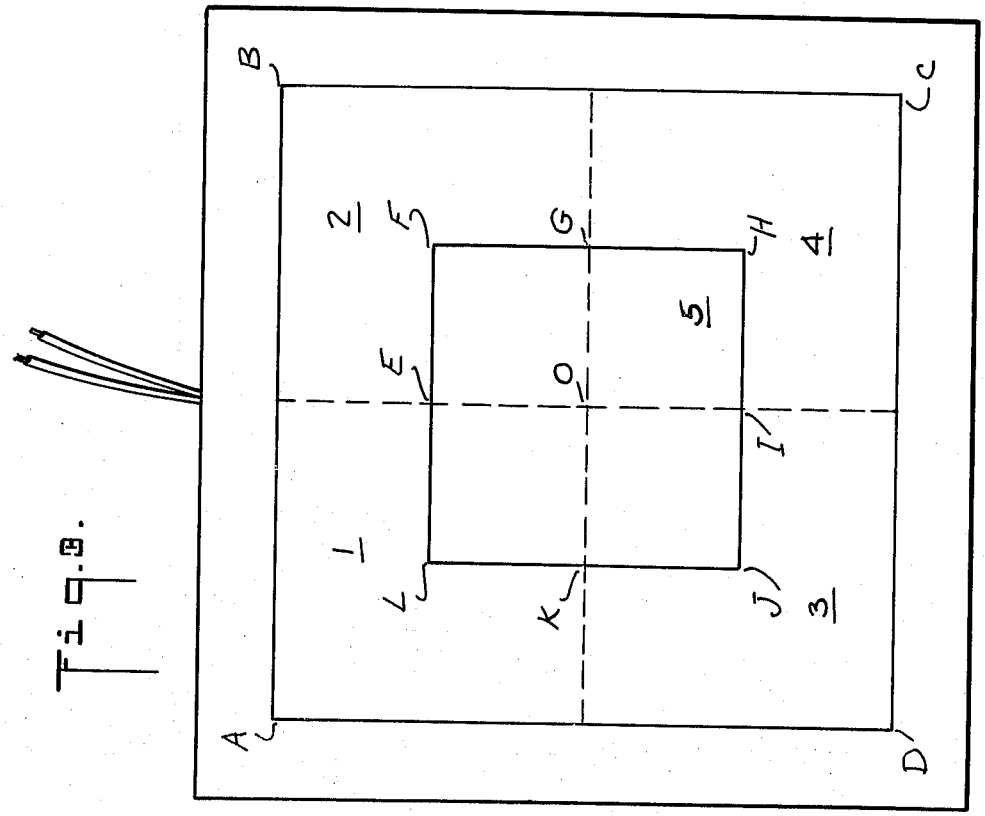

METHOD OF ADJUSTING THE SENSITIVITY OF A WEIGHING MAT

BACKGROUND OF THE INVENTION

This invention relates to methods of adjusting the sensitivities of weighing mats, and more particularly, to methods of adjusting the relative sensitivities of different sections of weighing mats of the type that utilizes the variation in electrical capacitance caused by the applied force of the load to be measured.

A weighing mat constructed in accordance with the method of this invention is preferably a thin, flexible mat whose electrical capacitance varies with the magnitude of the force that is applied to it by the load to be measured. The weighing mat is preferably a capacitor of large dimension in which the plates comprise electrically conductive elastomeric layers separated by electrically non-conductive elastomeric layers. In the unloaded condition, the mat has an initial capacitance based on the electrical properties of the mat components. When a compressive load is applied to the mat, the components undergo a deformation which causes a change in capacitance which is related to the magnitude of the applied compressive load. This change in capacitance can be measured by suitable electronic means, for example, as described in U.S. Pat. No. 3,565,195.

The weighing mat may be formed as a sandwich of three electrically conductive layers separated by two elastomeric dielectric layers to create a two-section electrical capacitor. The dielectric layers, in turn, are composed of pluralities of spaced elastomeric separator elements either separate or joined, and the central conductive layer is also of a deformable elastomeric material.

The geometry of the transverse cross section of each dielectric layer may comprise a plurality of spaced ribs of square cross-section separated by thin web areas. The cross sections of the ribs may be, for example, .0625 inch by .0625 inch and their spacing may be, for example, .0625 inch.

Some mats of the type described have been subject to the limitation that the sensitivity to compressive load, that is, change of output capacitance due to a compressive load divided by the magnitude of the load, varied excessively depending on the section of the mat subjected to the load. Such excessive variations were variations over limits dependent on the application for which the mat was used and for some applications might be excessive if sensitivity variations of more than ±5% occurred from one section of the mat to another. Prior mats manufactured in accordance with the geometrical construction described in U.S. Pat. No. 3,565,195 have in some cases had relative sensitivities that varied, for example, by ±15% or more from section to section of a mat.

The reasons for this wide variation are several and include the following:

1. Poor adhesion between the laminae.
2. Variations in the dielectric ribs, such as
   a. variable spacing between ribs,
   b. variable angularity between adjacent ribs,
   c. lack of parallelism between adjacent sides of ribs,
   d. stepped ribs due to entrapped air during the molding operation,
   e. rotation of ribs 90° eliminating the air space between the ribs, and
   f. thickness variations.
3. Variability of central conductor, such as
   a. long pitch waviness, and
   b. center of central section located off the center of the mat.
4. Variability of the dielectric webs. This is a severe bowing which forces web material into cavities between the ribs.
5. Variability in the overall thickness of the mat.

These variations in different degree arise during the fabrication of the individual laminae and during the assembly of the composite laminate.

SUMMARY OF THE INVENTION

It is an object of the present invention, therefore, to provide a new and improved method of adjusting the relative sensitivities of sections of a weighing mat which avoids the disadvantages of prior methods of manufacture of such mats.

It is another object of the invention to provide a new and improved method of adjusting the relative sensitivities of sections of an elastomeric capacitive weighing mat which is a simple and practical method.

It is another object of the invention to provide a new and improved method of adjusting the overall sensitivity of a weighing mat to a desired value within predetermined tolerance limits.

In accordance with the invention, the method of adjusting the relative sensitivities of sections of a weighing mat comprises assembling at least two electrically conductive layers separated by a deformable dielectric layer to form a weighing mat with sections of different sensitivities and removing from a mat section of low sensitivity at least one portion of at least one conductive layer.

DESCRIPTION OF THE DRAWINGS

Referring now to the drawings:

FIG. 3 is a diagrammatic plan view of the FIG. 1 mat;

FIG. 4 is a diagrammatic plan view of the FIG. 1 mat representing the mat at another stage of manufacture;

DESCRIPTION OF FIG. 1 WEIGHING MAT

Figure 1:
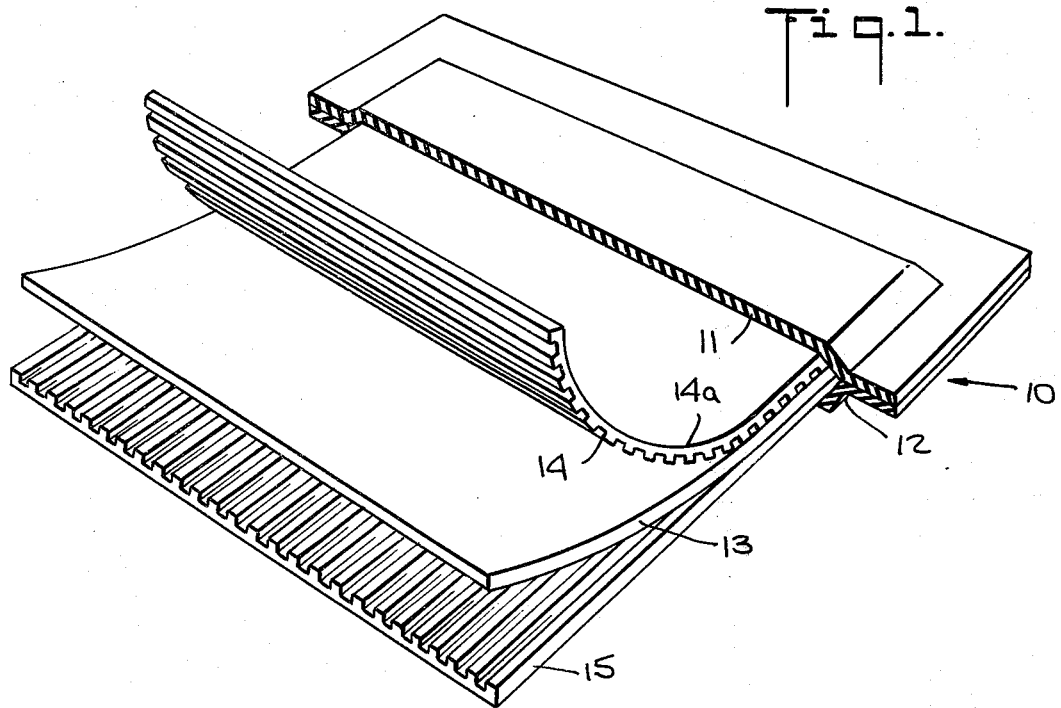
FIG. 1 is a schematic, fragmentary perspective view of a weighing mat in accordance with the method of the invention with portions of the mat being broken away and portions being represented as being separated to aid in viewing the construction of the mat.

Referring to FIG. 1, there is shown therein a weighing mat 10 in accordance with the method of the present invention. The composite mat 10 includes interior, flexible, conductive elastomeric layer 13, separated by dielectric, elastomeric, compliant layers 14 and 15 from exterior, flexible, conductive elastomeric layers 11 and 12. Layers 11, 12 and 13 may comprise a compliant, conductive elastomeric material having a thickness of, for example, 0.070 inch made according to the procedure and recipe given below. The two dielectric layers 14 and 15 may comprise a plurality of equally spaced, parallel projections comprising ribs on webs bonded to the inner faces of the conductive layers 11 and 12 with the ribs bonded to the faces of the conductive layer 13. The ribs preferably are so oriented that the ribs of one dielectric layer lie at right angles to the ribs of the other dielectric layer. The ribs may be square in cross section and may be separated by a thin web 14a. The ribs may be made according to the procedure and recipe given below.

Figure 2:
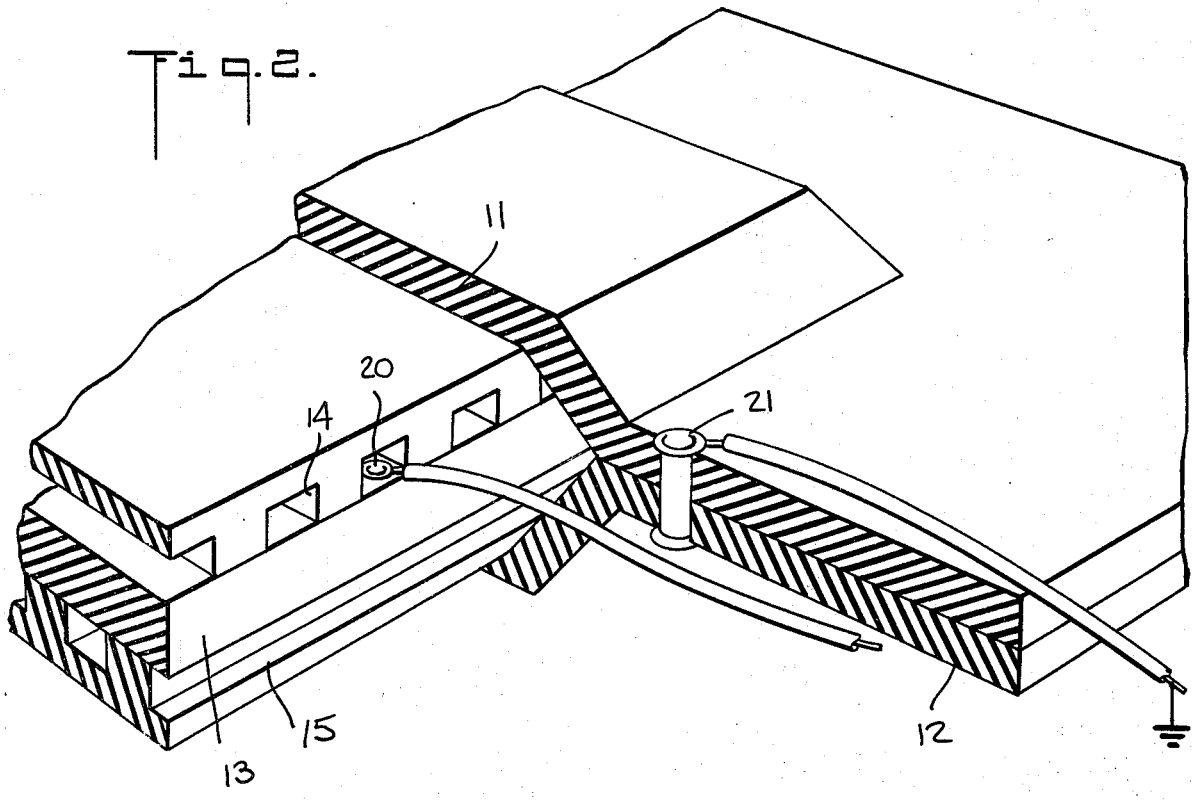
FIG. 2 is an enlarged fragmentary, perspective view of the FIG. 1 mat showing the electrical connections to the separate layers of the mat.

As shown in FIG. 2, the exterior conductive layers 11 and 12 are provided with an electrical connecting terminal comprising, for example, a grommet 21, and the central layer 13 is also provided with an electrical connecting terminal 20. In operation, terminal 11 preferably connects together both outer conductive layers 11, 12 electrically as shown to form one of the plates of a variable capacitor which may be grounded and terminal 20 is utilized for connection to a suitable electronic circuit.

When the thin flexible mat 10 is loaded by a compressive force, a change in capacitance is effected due to the compressive deformation of the dielectric layers 14 and 15, which deformation alters the spacing of the conductive layers 11, 12 and 13. This change in capacitance is measured by suitable electronic means and may be displayed as either a change in capacitance in picofarads (pf) or as the magnitude of the compressive load in suitable units, for example, in pounds.

FABRICATION OF THE DIELECTRIC LAYERS

The dielectric layers can be made from synthetic cis-1,4-polyisoprene elastomer compounded according to the following recipe:

| | Parts |
|---|---|
| Natsyn 400[1] | 100.0 |
| Magnesium Carbonate | 2.6 |
| Protox 169[2] | 3.0 |
| Dixie Clay[3] | 3.2 |
| Sunpar 2280[4] | 2.7 |
| Neophax E[5] | 1.25 |
| Naugawhite Powder[6] | 0.52 |
| Phthalic Anhydride | 0.2 |
| Di-ortho-tolylguanidine | 0.23 |
| Benzothiazyl disulfide | 1.16 |
| Stearic acid | 1.0 |
| Sulfur | 2.3 |
| ML-4 at 212°F. of the compounded elastomer is 25. | |

[1]Cis-1,4-polyisoprene elastomer from Goodyear Tire and Rubber Co.; sp. gr. = 0.91; ML-4 at 212°F. = 75–95.
[2]Zinc oxide from New Jersey Zinc Company; surface-treated with propionic acid; sp. gr. = 5.57; surface area = 10 sq. meters per gram.
[3]Kaolin hard clay from R. T. Vanderbilt Co., Inc. sp. gr. = 2.62 ± 0.03; fineness (325 mesh) 99.8%.
[4]Paraffinic oil from Sun Oil Co.; SUS viscosity at 100°F. = 2907; sp. gr. = 0.8916; molecular weight = 720; flash point, COC = 595°F.
[5]Vulcanized vegetable oil from Stamford Rubber Supply Co., sp. gr. = 1.05.
[6]Alkylated bisphenol from Uniroyal Chemical Co.; sp. gr. = 0.96.

The dielectric layers can be formed from the compounded elastomer in a mold using conventional compression molding techniques. The molding conditions are 15 minutes at 298°F.

FABRICATION OF THE CONDUCTIVE LAYERS

The conductive layers can be made from natural cis-1,4-polyisoprene elastomer compounded according to the following recipe:

| | Parts |
|---|---|
| Smoked sheet No. 2 | 100.0 |
| Conductive Black[1] | 87.5 |
| Sundex oil 790[2] | 8.5 |
| Zinc Oxide | 3.0 |
| Polyethylene AC-617[3] | 4.0 |
| Stearic Acid | 3.0 |
| BLE-25[4] | 1.05 |
| Phthalic anhydride | 0.5 |
| Benzothiazyl disulfide | 0.65 |
| Di-ortho-tolylguanidine | 0.1 |
| Sulfur | 2.6 |

[1]XC-72, extra conductive furnace carbon black, from the Cabot Corporation; average particle size = 290 Angstrom units.
[2]Aromatic oil from Sun Oil Co.; SUS viscosity at 210°F. = 85.7; flash point, 435°F.
[3]Mold release agent; low molecular weight polyethylene; Mol. wt. = 1,500; melting point = 88–90°C.; sp. gr. = 0.92 viscosity at 140°C. = 230 centipoises from Semet-Solvay Petrochemical Division of Allied Chemical & Dye Corp.
[4]A high temperature reaction product of diphenylamine and acetone from Uniroyal Chemical; sp. gr. = 1.09.

The conductive layers can be formed from the compounded elastomer in a compression mold. The inner conductive layer is calendered and steam cured as a flat sheet while the outer conductive layers are compression molded to a final dimension sufficient to overlap the internal layers by, for example, approximately one inch on edge. During the molding operation an open mesh flexible Monel metal fabric can be incorporated into the two outer conductive layers to provide electrical shielding for the mat against external electric fields.

The physical and electrical properties of the cured stock are as follows:

| | |
|---|---|
| Log Resistivity (*) | = 1.56 ohm-cm |
| Shore A Durometer | = 75 |
| Tensile, psi | = 3250 |
| Elongation, % | = 380 |
| 300% Modulus, psi | = 2250 |

(*) ASTM D257-66

It should be noted that other materials can be used for the conductive and dielectric layers. It is desirable that the creep and hysteresis properties of the cured elastomeric components be a minimum.

Correspondingly, the conductive layers can be of other elastic materials such as metal, for example, aluminum, steel, copper and the like. The plate must be thick enough to behave elastically under the applied loads to prevent inelastic deformations which result in local deformations in rib structure other than due to applied loading causing an erroneous output.

FINAL ASSEMBLY OF WEIGHING MAT

As indicated above, the weighing mat preferably has three conductive layers and two dielectric layers whose ribs are disposed at right angles to each other. It should be mentioned at this point that special care should be observed in order to get proper adhesion between the neighboring layers. This can be accomplished by washing the contacting surfaces of the conductive layers with Esso solvent No. 1 and allowing them to dry while lying in the flat condition. Next, the two dielectric layers can be trimmed to, for example, a 12 inch by 12 inch size and the center conductor can be trimmed to, for example, a 11¼ inch by 11¼ inch size and fitted with a wire lead at the center of one edge using a standard grommet fitting. Both sides of the center conductive layer and the contacting surfaces of the outer conductive layers can be brush coated with Chemlock 234

Adhesive and allowed to dry 24 hours at room temperature. Chemlock 234 is a heat sensitive adhesive for adhering cured rubber to cured rubber obtainable from Hughson Chemical Co., Division of Lord Corporation. The dielectric layers are similarly coated on both sides with Chemlock 234 and allowed to dry. The five layers can then be assembled and stapled with two staples on each of four extreme borders. This procedure prevents relative movement between the assembled parts prior to final cure. The stapled assembly can be placed in a compression mold preheated to 316°F. The assembly is then cured for 15 minutes at 70 psig steam (316°F.) in an 18 inch diameter ram press on low hydraulic pressure not to exceed 300 psig. Metal and fabric shims are placed on the mold edge lands of such thickness combination as to limit the compressive deformation on the total assembly to a maximum of one thirty-second inch. In order to prevent entrapment of gases the assembly can be vented during the final curing step by means of a one-sixteenth inch ID × .020 inch wall nylon tubing located so as to maintain an escape channel to the outside atmosphere. After the cure cycle the whole assembly is allowed to cool undisturbed to room temperature. The nylon vent is plugged with room temperature curing cement after 18 hours cooling and the second electrical lead wire is attached to the edge of the two outer conductive layers using a grommet.

Referring to FIG. 3, a diagrammatic plan view of the FIG. 1 mat is shown with the area for loading designated by lines between points A, B, C, D. This area is divided into five sections of equal area, namely, a central section 5, designated by lines between points E, F, G, H, I, J, K and L and four quadrants 1, 2, 3, 4 having the same dimensions as the said central section. It will be understood that these five areas may be marked on the mat by any suitable means, for example, by chalk. The center section 5 ordinarily has a greater stiffness in compression than the four quadrants 1, 2, 3, 4. This is due to the fact that the boundary conditions of the center section 5 are different from the boundary conditions of the four quadrants 1, 2, 3, 4 and also to thickness variations in the conductive and dielectric layers. This greater stiffness of section 5 as compared to the four quadrants or sections 1, 2, 3, 4 results in lower sensitivity of section 5 to an applied load. As used herein, sensitivity means the change in capacitance due to the application of a load divided by the magnitude of the load and may be expressed as picofarads per pound.

To function as a weighing system, the mat should be relatively insensitive to the location of the applied load, that is, the indicated load should be the same regardless of where the load is applied in the area bounded by the points A, B, C, D within certain selected limits for a given level of accuracy. To determine the sensitivity of the mat over the entire weighing area, a "footprint" sensitivity test has been devised. Assuming that the active weighing area A, B, C, D measures 10 × 10 inches the procedure is as follows:

1. The surface of the mat is subdivided into 5 inch by 5 inch sections as indicated in FIG. 3.

2. A 200 lb. compressive load is applied to each section using a supporting steel plate with a 5 inch by 5 inch contacting area or footprint.

3. The capacitance change obtained when the load is applied to each section is recorded. Five readings are taken on each section and the average capacitance change in picofarads (pf) is calculated for each section.

4. Each average value is then divided by 200 to give the sensitivity of each section in picofarads per pound.

5. The sensitivities of the four sections, 1, 2, 3, 4, when divided by the sensitivity of section 5, determine the relative gain of each of the sections. If the selected limits of accuracy are set as ±5%, then the relative gain values for each of sections 1, 2, 3, 4 should fall within the range of 0.95 to 1.05. This will define a mat which is acceptable from the standpoint of footprint sensitivity. The significance of a relative gain range of 0.95 to 1.05 is that a 100 pound weight with a footprint of 5 by 5 inches, depending on its location within the loading area A, B, C, D, will appear to weight anywhere from a minimum of 95 pounds to a maximum of 105 pounds.

The adjustment of the footprint sensitivity ordinarily is based on the reduction of the stiffness in compression of the center section 5 of the mat. This is accomplished by removing selected portions of the mat, as by drilling, from the center section 5 in a pattern preferably along lines EOI, KOG, LEF, FGH, JIH and JKL. This procedure will exert a maximum effect on the center section 5 and a minimum effect on each of sections 1, 2, 3, 4, removing four times the area from the center section as compared to the other four sections.

FIG. 4 shows how this method of the sensitivity adjustment was applied to a finished mat of the recipes described above.

In this instance, ¼ inch diameter holes were spaced on ½ inch centers starting with the center hole with the exception of the four outermost holes which were placed just inside the boundary of L, F, H, J. The center hole and the four adjoining holes were drilled, the footprint sensitivity measured and the relative gain calculated. Then the next group of four holes was drilled, and the relative gain calculated. The process was repeated two more times until 21 holes had been drilled in the pattern as shown in FIG. 4.

Before adjustment the relative gain of the four sections 1, 2, 3, 4 varied from 1.03 to 1.11 whereas after adjustment the relative gain varied only from 1.000 to 1.023. The actual values for this mat are given in Table I.

TABLE I

| Position | 1 | 2 | 3 | 4 | 5 |
|---|---|---|---|---|---|
| Relative gain before adjustment | 1.032 | 1.083 | 1.095 | 1.11 | 1.000 |
| Relative gain after adjustment | 1.000 | 1.012 | 1.000 | 1.023 | 1.000 |

By following this procedure, it is possible to make very large changes in footprint sensitivity. For example, if the sensitivity of section 5 is very low, it is possible to drill enough holes in section 5 so that section 5 is completely removed from the mat leaving three-fourths of sections 1, 2, 3 and 4. During successive drillings, the sensitivity of section 5 would approach a very large value. Hence, the range of adjustment is large. This procedure, that is, removing section 5 completely, would still make an acceptable mat for applications where several mats are used side by side and the mats are covered by a metallic plate to which the load is applied.

After the sensitivity has been adjusted to the desired value, the drilled area should be covered, for example, with a thin elastomeric (possibly fabric reinforced) material to prevent moisture and debris from entering the mat. The patch should be bonded to each side of the mat. The patch should preferably extend to the outer edges of the mat to prevent localized strains due to the thickness of the patch. The patching could be accomplished using pressure-sensitive tape of suitable dimensions such as Permacel P68 tape from Permacel Corp., New Brunswick, New Jersey. It is obvious that the maximum deviation in relative gain of the above mat could have been reduced still further from 1.023 down to 1.000 if extreme accuracy had been required.

Figure 5:
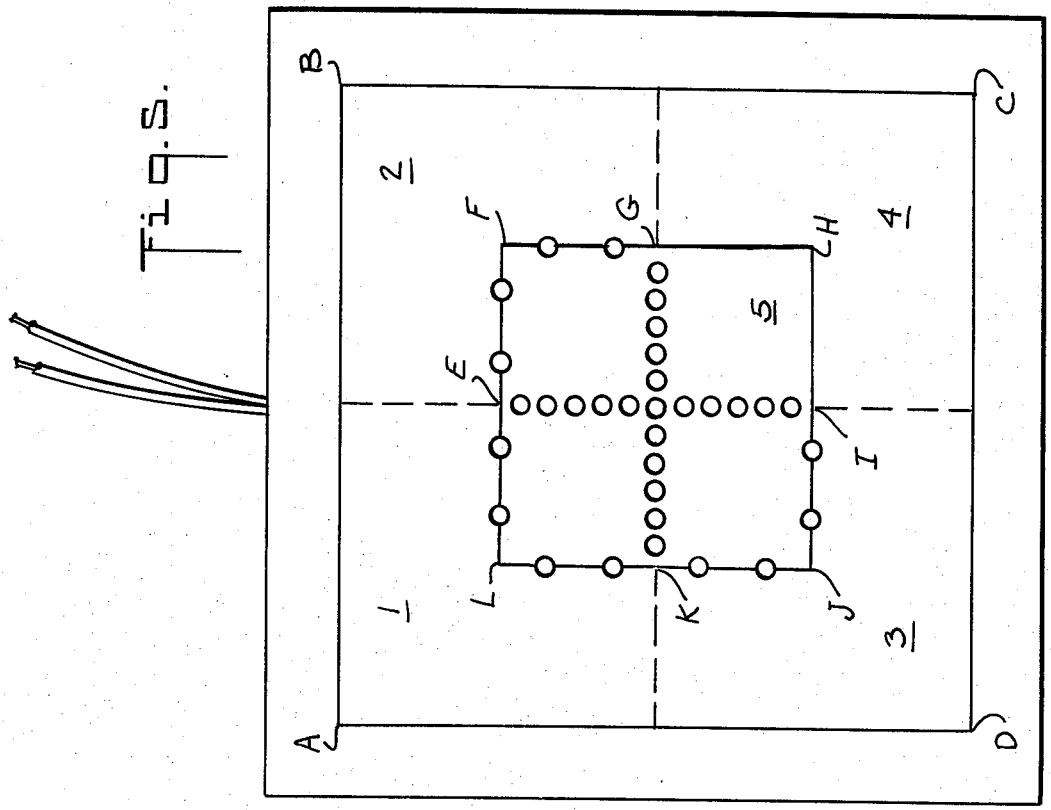
FIG. 5 is a diagrammatic plan view of a mat constructed in accordance with another method of the invention.

In some cases, the method of adjusting the relative sensitivities of sections of the mat may require more than one series of drillings to bring the relative gains of all of the five sections within the selected tolerance limits. For example, a first series of drillings may be made along the perpendicular center lines of section 5 consisting of nine ¼ inch diameter holes on 1 inch centers. An additional 12 holes along the center lines might then be required after measurement of the relative gains and still another group of 12 might be required on the periphery of section 5 in sections 1, 2 and 3. It will be understood that the pattern of holes, as represented in FIG. 5, is by way of example only and any suitable pattern may be determined experimentally to bring the relative gain of selected sections within desired tolerance limits. A thin, fabric reinforced elastomeric layer may be adhered to both sides of the mat after the final drilling.

A preferred method of adjusting the relative sensitivities of sections of the mat, to avoid the need for the additional fabric reinforced elastomeric layer after the final drilling, includes the step of prepunching or drilling, the center conductive layer or, alternatively, prepunching or drilling the center conductive layer and its adjacent dielectric layers. An advantage of a construction in which only the central conductive layer is prepunched is elimination of the necessity for alignment of holes in adjacent layers as when the dielectric layers are also prepunched or drilled. Such alignment is necessary to prevent short circuiting of the electrodes.

Also in accordance with the invention, the method of adjusting the relative sensitivities of sections of a weighing mat comprises forming a plurality of similar electrically conductive layers, forming a plurality of similar deformable dielectric layers, assembling at least two of the electrically conductive layers and at least one of the dielectric layers into a first weighing mat with the electrically conductive layers separated by a dielectric layer. This mat may be constructed in accordance with the embodiment of FIGS. 1, 2 and 3. The method also comprises the step of measuring the sensitivities of predetermined sections of the assembled mat and removing from a mat section of low sensitivity at least a portion of at least one conductive layer to bring the relative sensitivities of sections of the mat within predetermined tolerance limits, as previously described in connection with the embodiment of FIGS. 3 and 4.

The method also comprises the step of removing from at least one of the unassembled conductive layers, prior to assembly into a second mat, at least a portion corresponding to the removed portion of the conductive layer of the assembled mat, and assembling the conductive layer with the removed portion and at least another unassembled conductive layer and at least an unassembled one of the dielectric layers into a second mat.

Figure 6:
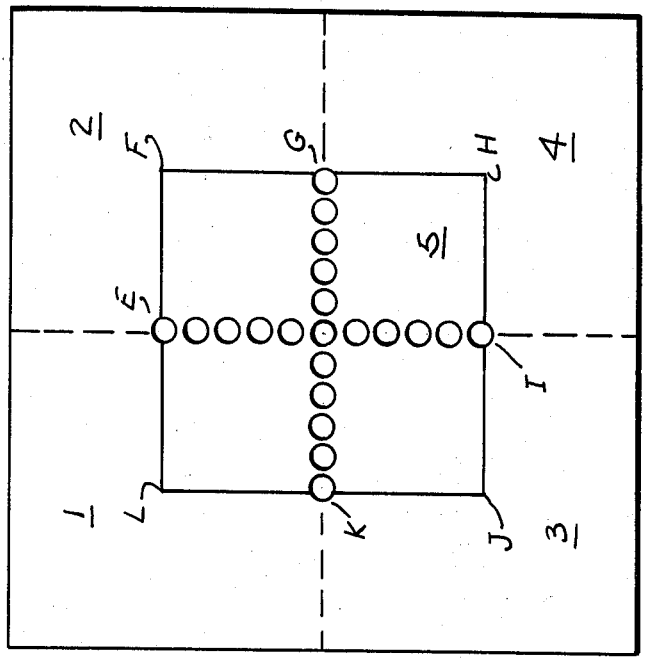
FIG. 6 is a diagrammatic plan view of a central conductive layer of a mat constructed in accordance with another method of the invention.

The conductive layer for the second mat may be, for example, as represented in FIG. 6 with holes similar to the holes of the FIG. 4 mat except that, for example, ½ inch diameter holes are made in the conductive layer rather than, for example, ¼ inch diameter holes to compensate for the fact that the outer conductive layers and the dielectric layers were not prepunched or drilled.

More particularly, the method described in connection with the embodiment having a conductive layer as represented, for example, in FIG. 6 comprises the step of assembling three of the electrically conductive layers and two of the dielectric layers into a first weighing mat with the electrically conductive layers separated by a dielectric layer. The conductive layer with the removed portion and two other conductive layers and two dielectric layers are assembled into a second weighing mat with dielectric layers separating the conductive layers and with the conductive layer with the removed portion between the dielectric layers.

It is possible that during assembly of a mat some uncontrolled variable may result in a mat which has one or more sections which exhibit a relative gain in excess of the selected limits of, for example, .95 to 1.05. In this event, it is still possible to bring the relative gains of all sections within the specified limits by drilling additional holes in a suitable pattern in accordance with this invention.

Also in accordance with the invention, it is possible to adjust the overall sensitivity of individual mats to a given sensitivity value, thereby permitting their use in matched sets. By the method of the invention, it is only possible to increase the sensitivity of a given mat since the method requires the removal of material which, in turn, decreases the compressional resistance of the mat. In accordance with the invention, the method of adjusting the overall sensitivity of a weighing mat to a desired value within predetermined tolerance limits comprises assembling at least two similar electrically conductive layers separated by a deformable dielectric layer to form a weighing mat with an overall sensitivity less than a desired value. The method also comprises the step of removing from the mat at least a portion of at least one conductive layer. Since it is only the overall sensitivity of the mat which is desired to be reduced, the mat may be drilled in various patterns until the overall sensitivity is at the desired value. Of course, if desired, the sensitivity of individual sections of the mat may be adjusted as previously described herein. If only the overall sensitivity of the mat is adjusted without regard to adjustment of the sensitivity of individual sections of the mat, that mat may be utilized by placing a rigid metallic plate over the entire surface of the mat and applying the load thereto.

The method of adjusting the overall sensitivity of the mat to be the same as the overall sensitivity of another mat may include the step of removing, prior to assembly into a second mat, at least one portion of a third similar conductive layer corresponding to the removed portion of the one conductive layer of the first mat and assembling the third conductive layer and at least one dielectric layer and another conductive layer into a second mat. In a mat having three conductive layers, this step may involve prepunching or drilling or otherwise removing from the central conductive layer, prior to assembly into a second mat, a portion corresponding to the removed portion of the first conductive layer of the first mat. Similarly, portions of the dielectric layers of the second mat may be removed prior to assembly into the second mat to bring the second mat to an overall sensitivity of a desired value matching that of a first mat which has been brought to the desired overall sensitivity value.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. The method of adjusting the relative sensitivities of sections of a weighing mat comprising:

assembling at least two electrically conductive layers separated by a deformable dielectric layer to form a weighing mat with sections of different sensitivities;

measuring the sensitivities of said sections to determine the relative sensitivities of said sections;

and removing from one or more of said sections having low sensitivity at least one or more portions of said conductive and dielectric layers to bring the relative sensitivities of said low sensitivity sections of the mat within predetermined tolerance limits.

2. The method in accordance with claim 1 in which said mat section of low sensitivity is a central section and the step of removing at least one portion of said conductive and dielectric layers comprises removing from said central section of said mat selected portions in a pattern which removes more material from said central section of said mat than from any single border section of said mat.

3. The method in accordance with claim 1 in which the step of assembling said conductive and dielectric layers comprises assembling said conductive and dielectric layers to form a mat of substantially square surface area which has four border sections of equal area and which has a central section of the same area and overlapping said four border sections and in which the step of removing selected portions from said central section comprises removing portions within said central section and on the boundaries of said four border sections.

4. The method of adjusting the relative sensitivities of sections of a weighing mat comprising:

forming a plurality of similar electrically conductive layers;

forming a plurality of similar deformable dielectric layers;

assembling at least two of said electrically conductive layers and at least one of said dielectric layers into a first weighing mat with said electrically conductive layers separated by a dielectric layer;

measuring the sensitivities of predetermined sections of said assembled mats;

removing from a mat section of low sensitivity at least one portion of at least one conductive layer to bring the relative sensitivities of sections of the mat within predetermined tolerance limits;

removing from at least an unassembled one of said conductive layers prior to assembly into a second mat at least one portion corresponding to a removed portion of said conductive layer of said assembled mat;

and assembling said conductive layer with said removed portion and at least another unassembled conductive layer and at least an unassembled one of said dielectric layers into a second mat.

5. The method in accordance with claim 4 in which the step of assembling said electrically conductive and dielectric layers into a first weighing mat comprises assembling three of said electrically conductive layers and two of said dielectric layers into a first weighing mat with said electrically conductive layers separated by said dielectric layers and in which the step of assembling said conductive layer with said removed portion and at least another unassembled conductive layer and at least an unassembled one of said dielectric layers into a second mat comprises assembling said conductive layer with said removed portion and two other conductive layers and two dielectric layers into a second weighing mat with dielectric layers separating said conductive layers and with said conductive layer with said removed portion between said dielectric layers.

6. The method in accordance with claim 4 which includes the step of removing from said mat section of low sensitivity of said first mat at least one portion of at least one dielectric layer and removing from at least one of said unassembled dielectric layers prior to assembly into a second mat at least one portion corresponding to a removed portion of said dielectric layer of said assembled mat and in which the step of assembling said conductive layer with said removed portion and another conductive layer and at least one of said dielectric layers into a second mat includes the step of assembling said dielectric layer with said removed portion into said second mat.

7. The method of adjusting the overall sensitivity of a weighing mat to a desired value within predetermined tolerance limits which comprises:

assembling at least two similar elastomeric electrically conductive layers separated by a deformable elastomeric dielectric layer to form a weighing mat with an overall sensitivity less than a desired value;

mechanically removing from the mat at least one portion of at least one conductive layer;

removing prior to assembly into a second mat at least one portion of a third similar conductive layer corresponding to the removed portion of said one conductive layer; and assembling said third conductive layer and at least one dielectric layer similar to said dielectric layer of said first mat and another conductive layer into a second mat.

* * * * *